United States Patent
Tadano

(10) Patent No.: US 6,616,160 B2
(45) Date of Patent: Sep. 9, 2003

(54) STRUT MOUNT

(75) Inventor: Hideo Tadano, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/827,514

(22) Filed: Apr. 5, 2001

(65) Prior Publication Data

US 2002/0171222 A1 Nov. 21, 2002

(51) Int. Cl.[7] .............................. B60G 15/00
(52) U.S. Cl. .................. 280/124.147; 280/124.155; 267/220
(58) Field of Search .................. 280/124.147, 124.155; 267/220; 188/321.11

(56) References Cited

U.S. PATENT DOCUMENTS

| | | | |
|---|---|---|---|
| 4,260,177 A | * 4/1981 | Pflughaupt et al. | 267/153 |
| 4,325,566 A | * 4/1982 | Stephan | 280/124.155 |
| 4,568,067 A | * 2/1986 | Iwata | 267/220 |
| 4,618,127 A | * 10/1986 | Le Salver et al. | 188/321.11 |
| 4,981,287 A | * 1/1991 | Cothenet | 267/153 |
| 5,251,928 A | * 10/1993 | Maeda | 267/195 |
| 2001/0015537 A1 | * 8/2001 | De Fontenay et al. | 280/124.155 |

FOREIGN PATENT DOCUMENTS

| | | | | |
|---|---|---|---|---|
| EP | 479548 A1 | * | 4/1992 | ............ F16F/01/38 |
| EP | 619196 A1 | * | 10/1994 | ........... B60G/15/06 |
| JP | 10-220519 | | 8/1998 | |
| JP | 2001-63331 | | 3/2001 | |
| JP | 2001-63332 | | 3/2001 | |

* cited by examiner

*Primary Examiner*—Paul N. Dickson
*Assistant Examiner*—Laura B. Rosenberg
(74) *Attorney, Agent, or Firm*—Jordan and Hamburg LLP

(57) ABSTRACT

In a strut mount to be interposed between a shock absorber and a vehicular body in a suspension of a vehicle, a strut mount is provided which can reduce the rigidity in a wrench direction of the rod of the shock absorber. A strut mount 10 has a fixing surface portion 18 vertical to a rod 5, an inner member 12 having an aperture 20 provided at the fixing surface portion 18 to which a tip of the rod 5 is inserted from the below, an outer member 14 surrounding an outer periphery of the inner member 12 and mounted on a vehicular body 3, and an elastic member 16 uniting together the both. On an upper side of the fixing surface portion 18, the elastic member 16 unites together the inner member 12 and the outer member 14, while, on the lower side of the fixing surface portion 18, a gap 28 is secured circumferentially between the inner member 12 and the outer member 14.

6 Claims, 5 Drawing Sheets

STRUT MOUNT

BACKGROUND OF THE INVENTION

The present invention relates to a strut mount to be interposed between a shock absorber and a vehicular body in a vehicular suspension.

FIG. 5 is an essential-part magnifying sectional view of an automotive suspension including a conventional strut mount 100. As shown in the figure, the suspension is provided with a shock absorber 122 having an outer tube 120 to be connected to a wheel side and a piston rod 121 to be connected to a vehicle-body side. Also, a coiled spring 124 is coaxially arranged over an outer periphery of the outer tube 120 and shock absorber 121.

The strut mount 100 comprises an inner cylindrical metal member 101 to which a tip of a rod 121 of the shock absorber 122 is inserted, a rubber elastic member 102 adhered by vulcanization to an outer periphery of the inner cylindrical metal member 101 in a manner surrounding same, and an outer metal member 103 in a case form receiving the rubber elastic member 102. The rod 121 at its tip is inserted in the inner cylindrical metal member 101 and tightened with a nut 104, thereby fixing the tip of the rod 121 to the inner cylindrical metal member 101. Also, the outer metal member 103 is attached to the vehicular body 130 by bolts 105 and nuts 106. The inner cylindrical metal member 101 has, in an axial center, a flange-like projection 107 so that the rod 121 is regulated from displacing a predetermined amount or more in a vertical direction and a horizontal direction of the vehicle by the projection 107.

In the strut mount as above, there is generally a requirement and devising made to decrease the rigidity against the displacement of the rod 121 in a vertical direction of the vehicle and increase the rigidity against the displacement of the rod 121 in a left-and-right direction of the vehicle. Also, there are cases for a requirement to decrease the rigidity against the displacement in a wrench direction of the rod 121 (i.e. rod-inclining direction) besides the properties for such vertical direction and left-and-right direction. This because, if the rigidity in the wrench direction is high, the rod 121 has friction with a top end of the outer tube 120 thus giving a cause of vibration, and because of the need to increase the thickness of the rod 121 from the problem with strength.

However, in the conventional strut mount 100, it is structurally difficult to decrease the rigidity in the wrench direction without changing the rigidity in the vertical direction and left-and-right direction of the vehicle. Thus, the foregoing requirement cannot be met.

SUMMARY OF THE INVENTION

The present invention has been made in view of the above points, and it is an object to provide a strut mount capable of reducing the rigidity in a wrench direction of the rod.

A strut mount of the invention is a strut mount to be interposed between a shock absorber and a vehicular body in a vehicular suspension, comprising: an inner member having a fixing surface portion vertical to a rod of the shock absorber and an aperture provided in the fixing surface portion to which a tip of the rod is inserted from below; an outer member surrounding an outer periphery of the inner member and to be mounted to a vehicular body; and an elastic member uniting the inner member and the outer member together; wherein the elastic member unites the inner member and the outer member on a side above the fixing surface portion fixed with the rod; and a gap being secured circumferentially between the inner member and the outer member on a side below the fixing surface portion.

In this strut mount, the rod of the absorber is fixed on the fixing surface portion of the inner member vertical to the rod, and the elastic member unites the inner member and the outer member together only on a side above the fixing surface portion while a gap is circumferentially secured between the inner member and the outer member on a side below the fixing surface portion. Accordingly, rigidity can be reduced in a wrench direction of the rod. Also, by adjusting the size of this gap, the wrench angle of the rod usually less than 5 degrees in the conventional can be increased to 10 degrees or more, for example, to nearly 15 degrees. It is thus possible to cope with a vehicular model requiring an increased wrench angle.

In the strut mount of the invention, there may be a case that the inner member comprise a cup-like member having the fixing surface portion as a bottom and opened to the above, the outer member having an inner peripheral wall surrounding an outer periphery of the cup-like member, and the cup-like member at a side wall spreading in an inverted-taper form directed toward the above, to have an outer peripheral surface of the side wall united with the inner peripheral wall of the outer member by the elastic member. By slanting the side wall of the inner member upward and outward in a united portion of the inner member and outer member by the elastic member like this, the rigidity in the rod-wrench direction can be reduced further effectively.

In this case, the inner member may comprise a first member that is the cup-like member and a cup-like second member opened to the below to receive the tip of the rod from the below, to form the fixing surface portion by uniting together bottom surfaces of the first member and the second member, and the gap being secured over an outer periphery of a side wall of the second member.

In the strut mount of the invention, there may be a case that the gap be formed different in size in a circumferential direction. By circumferentially making different in this manner the size of the gap secured between the outer member and the inner member on a side below the fixing surface portion, the wrench angle of the rod can be varied in the circumferential direction. In this case, the gap at radially opposite two portions is preferably formed greater than in the other portions. For example, by increasing the gap at opposite two portions in a front-and-rear direction of the vehicle, the wrench angle in the front-and-rear direction can be given greater than the wrench angle in a left-and-right direction of the vehicle. The measure for making the gap circumferentially different in size in this manner involves that the outer member comprises an inner peripheral wall surrounding the outer periphery of the inner member, and a spacing between the inner peripheral wall of the outer member and the inner member being set different in size in a circumferential direction on a side below the fixing surface portion.

In the strut mount of the invention, also, the inner member comprises a cup-like member having the fixing surface portion as a bottom and opened to the above, the outer member having an inner peripheral wall surrounding an outer periphery of the cup-like member, an outer peripheral surface of a side wall of the cup-like member and the inner peripheral wall of the outer member being united by the elastic member, and the cup-like member at a top-end opening having a flange radially outwardly extending beyond the inner peripheral wall of the outer member, to have a cutout provided at least in a circumferential part of the flange. By doing so, the wrench angle of the rod can be varied in the circumferential direction. In this case, the cutout is preferably provided at radially opposite two portions. Also, by forming the gap in a position radially opposite to the cutout greater than in the other portions, the circumferential change of the wrench angle can be increased furthermore.

DETAILED DESCRIPTION OF PREFERRED EMBODIMENTS

Explanation will be made on a strut mount 10 according to a first embodiment of the present invention, on the basis of FIG. 1.

Figure 1:
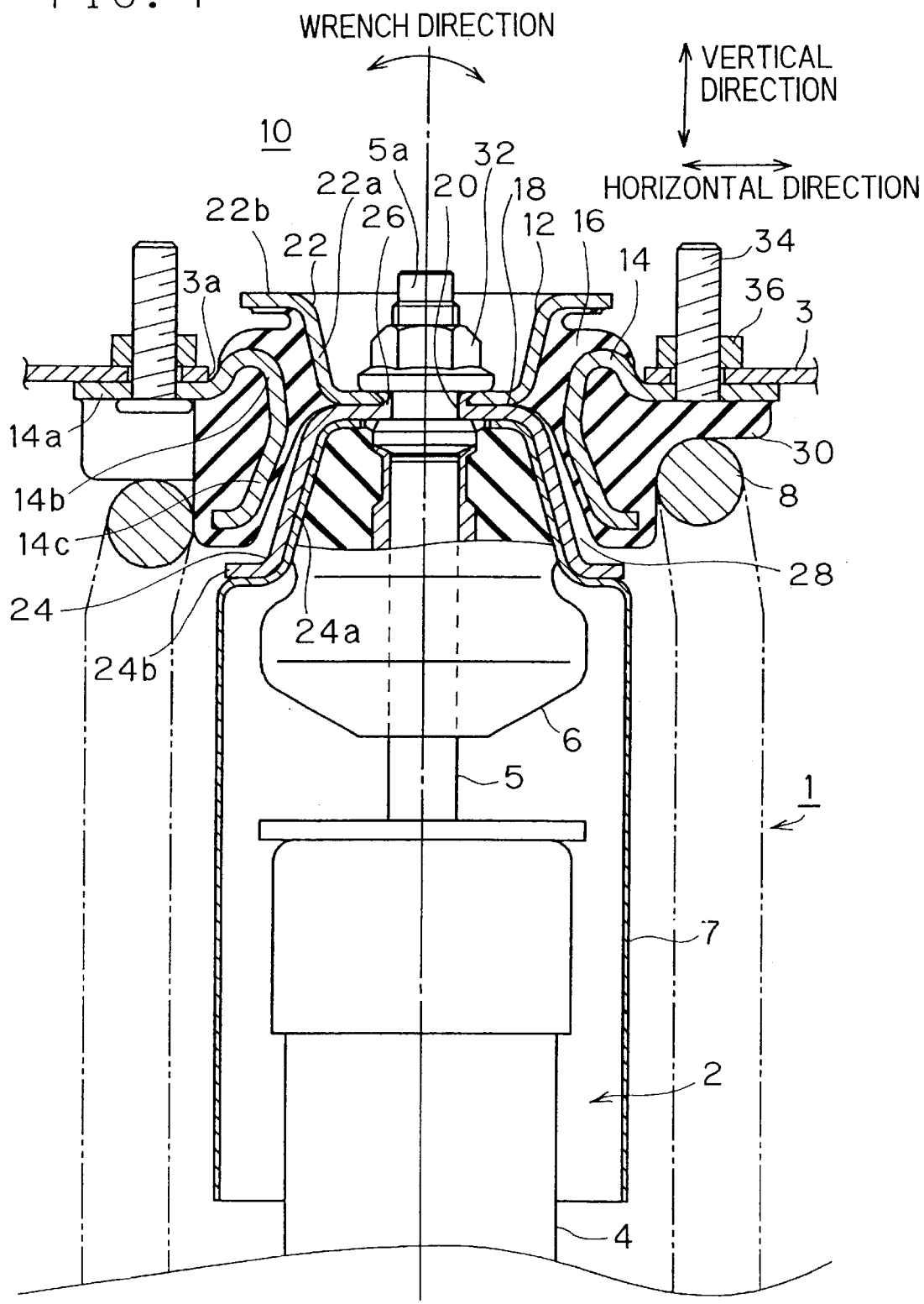
FIG. 1 is an essential-part magnifying sectional view of a vehicular suspension including a strut mount according to a first embodiment of the present invention.

As shown in FIG. 1, the strut mount 10 interposed between a shock absorber 2 and a vehicular body 3 in an automotive suspension 1 is an anti-vibration device elastically uniting the both.

The shock absorber 2 has an outer tube 4 connected to a wheel side and a piston rod 5 projecting at a top end of the tube 4 to be connected to a vehicular body side. This rod 5 penetrates through a bound bumper 6 and attached at its top end to the strut mount 10. The outer tube 4 at an upper periphery is surrounded with a cylindrical cover 7. This cover 7 has a top surface portion generally in an inverted cup form to have the bound bumper 6 fitted at an inside thereof. A coiled spring 8 is arranged in a manner coaxially surrounding the periphery of the cover 7 and outer tube 4.

The vehicular body 3 has an aperture 3a so that the strut mount 10 can be assembled from the below into this aperture 3a.

The strut mount 10 has an inner metal member 12 to which the top end of the rod 5 is inserted and fixed from the below, an outer metal member 14 surrounding an outer periphery of the inner metal member 12 and attached to the vehicular body 3, and a rubber elastic member 16 uniting the inner metal member 12 and the outer metal member 14 into one body.

The inner metal member 12 has circular fixing surface portion 18 provided vertical to the rod 5. This fixing surface portion 18 has an aperture 20 provided at a center of this fixing surface portion 18 to which the rod 5 is to be inserted. Specifically, the inner metal member 12 comprises a cup-like first member 22 having a fixing surface portion 18 as a bottom surface to be opened to the above and a cup-like second member 24 opened to the below to receive the upper portion of the rod 5 from the below. By uniting together the bottom surfaces of the first member 22 and the second member 24, the fixing surface portion 18 is formed. In this embodiment, the both at their bottom surfaces are united by caulking an aperture edge at the bottom surface of the first member 22 on an aperture flange 26 at the bottom surface of the second member 24.

The first member 22 has its sidewall 22a spread in an inverted-taper form directed toward the above, i.e., the sidewall 22a is slanted upward and outward. The first member 22 has a flange 22b provided at a top-end opening and spread radially outwardly beyond an inner peripheral wall of the outer metal member 14.

The second member 24 at its sidewall 24a is spread in an inverted-taper form directed to the below to have a radially outwardly spreading flange 24b at its lower end opening. The cover 7 is fitted on the inner side of this second member 24.

The outer metal member 14 comprises a mount-surface portion 14a to the vehicular body 3, a first inner-peripheral wall 14b radially inwardly extending from the mount-surface portion 14a and surrounding an outer periphery of the first member 22, and a second inner-peripheral wall 14c extended from a lower end of the same and surrounding an outer periphery of the second member 24. The first inner peripheral wall 14b is provided similarly slanted to surround, generally parallel with, the side wall 22a slanted upward and outward. Also, the second inner peripheral wall 14c is provided similarly slanted to surround, generally parallel with, the sidewall 24a slanted downward and outward.

The rubber elastic member 16 unites between the inner metal member 12 and the outer metal member 14, only on the upper side of the fixing surface portion 18 fixed with the rod 5. A gap 28 is circumferentially secured on the lower side of the fixing surface portion 18 between the inner metal member 12 and the outer metal member 14.

Specifically, the first member 22 of the inner metal member 12 and the outer metal member 14 are formed in one body by cure-form the rubber elastic member 16 between them. The second member 24 is united to the first member 22 after curing. More specifically, the rubber elastic member 16 unites between the outer peripheral surface of the first member 22 and the first inner peripheral wall 14b of the outer metal member 14, covers the inner peripheral surface of the second inner peripheral wall 14c from this uniting portion, and reaches a backside surface of the mount-surface portion 14a through the lower end of the same. By the rubber elastic member 16 extended to the backside surface of this mount-surface portion 14a, a spring seat 30 is formed to elastically support the coiled spring 8.

The above gap 28 is provided over the entire of the outer periphery of the sidewall 24a of the second member 24, i.e., between the sidewall 24a and the rubber covering the second inner peripheral wall 14c. The gap 28 is gradually broadened as the lower is approached along the side wall 24a away from the fixing surface portion 18, and structured such that, when the rod 5 is wrenched to be inclined a predetermined angle or more, the side wall 24a comes into a surface-to-surface contact with the rubber covering the second inner peripheral wall 14c.

The strut mount 10 structured as above is united on the rod 5 by inserting a bolt portion 5a at a tip of the rod 5 into the aperture 20 of the fixing surface portion 18 of the inner metal member 12 from below and tightening it with a nut 32. That is, the rod 5 is mounted and fixed to the inner metal member 12 by the fixing surface portion 18 as a fixing portion in a planar form. Also, the outer metal member 14 is mounted and fixed to the vehicular body 3 through bolts 34 and nuts 36.

With the strut mount 10 of the first embodiment as explained above, the rod 5 of the absorber 2 is fixed on the fixing surface portion 18 of the inner metal member 12, the elastic member 16 on the upper side of the fixing surface portion 18 unites together the inner metal member 12 and the outer metal member 14, on the lower side, secures a gap 28 between the inner metal member 12 and the outer metal member 14. Moreover, in the uniting portion, the sidewall 22a of the inner metal member 12 is slanted above and outward. From the above, it is possible to effectively reduce the rigidity of the rod 5 in a wrench direction.

Figure 5:
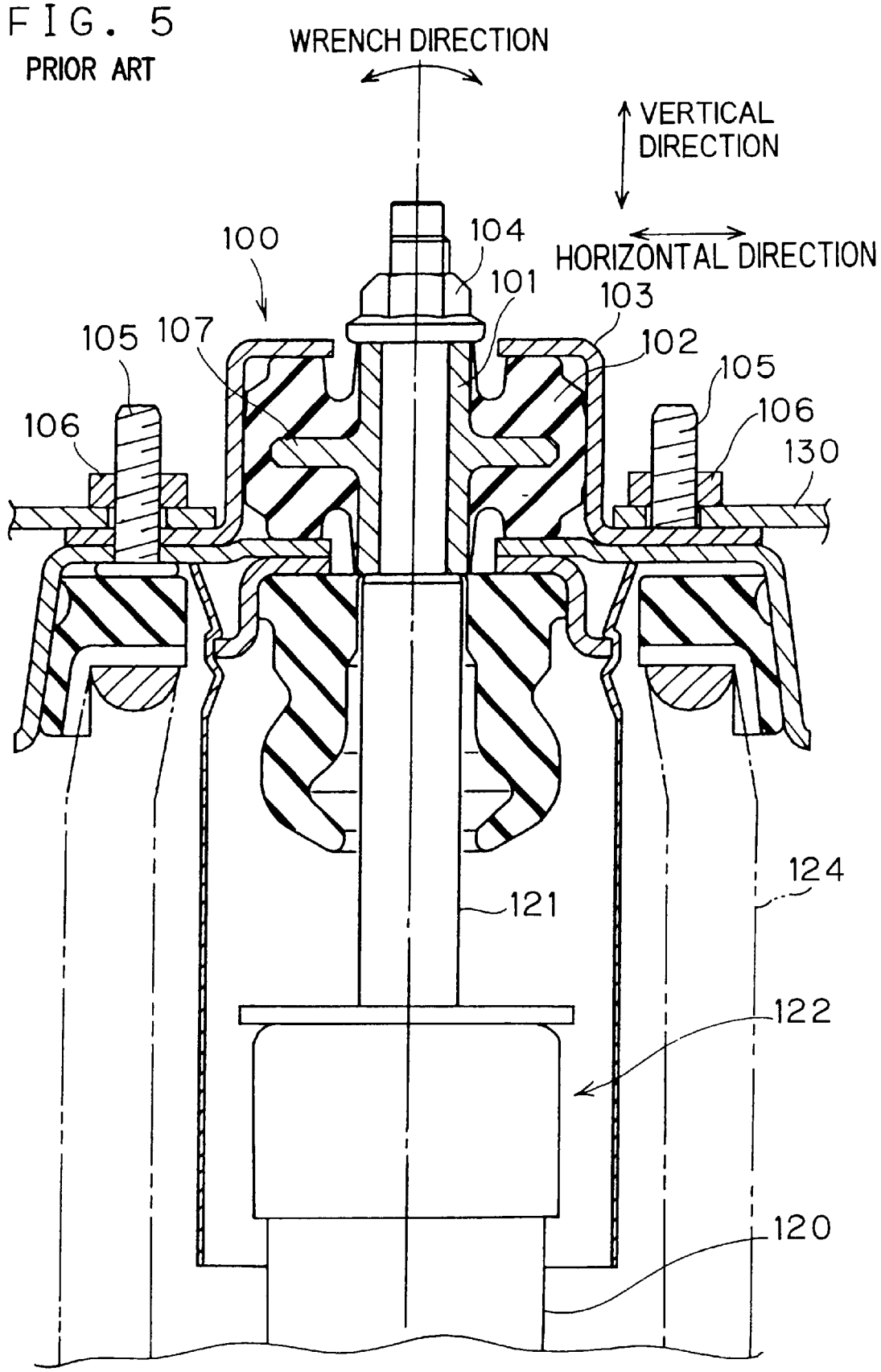
FIG. 5 is an essential-part magnifying sectional view of a vehicular suspension including a conventional strut mount.

For example, in the conventional strut mount 100 shown in FIG. 5, the rigidity against the displacement in the rod wrench direction was 5 Nm/deg when the rigidity against the displacement of the rod in the vertical direction of the vehicle was 500 N/mm and the rigidity against the displacement of the rod in the left-and-right direction was 1000 N/mm. In contrast, in the strut mount 10 of the first embodiment, it is possible to provide a rigidity of 2 Nm/deg against the displacement of the rod in the wrench direction while maintaining the rigidity in the vertical direction and left-and-right direction of the vehicle, thus making possible to greatly reduce the rigidity in the wrench direction.

Accordingly, with the strut mount 10 of the present embodiment, it is possible to reduce the rigidity in the wrench direction as compared to the conventional without changing the rigidity in the vertical direction and left-and-right direction of the vehicle.

Next, a strut mount 50 according to a second embodiment will be explained with reference to FIG. 2 to FIG. 4.

The strut mount 50 of the second embodiment is different from the first embodiment in that the wrench angle on the rod 5 is structurally given different in magnitude in the circumferential direction. Hereunder, the portions designated with the identical numerals to the first embodiment have same structures, and explanation thereof is omitted.

Figure 2:
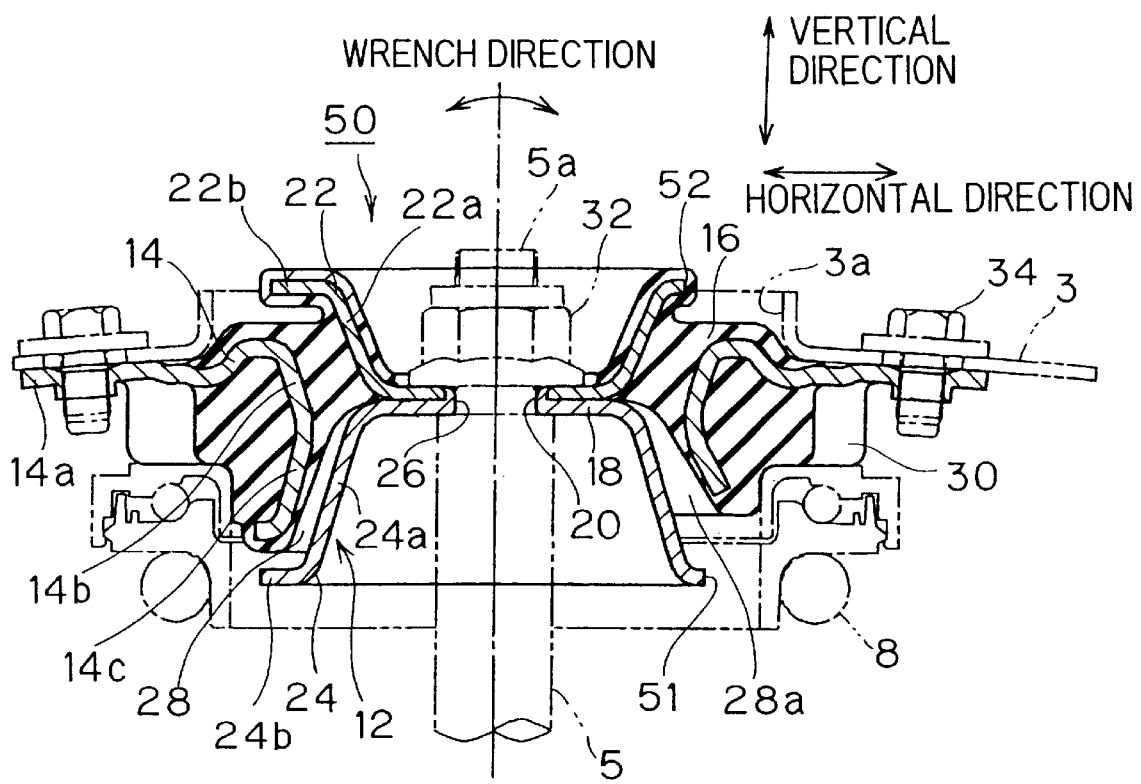
FIG. 2 is a sectional view of a strut mount according to a second embodiment of the invention, showing a section on line A—A in FIG. 3 and FIG. 4.

As shown in FIG. 2, in this strut mount 50, a gap 28 secured on the under side of a fixing surface portion 18 between an inner metal member 12 and an outer metal member 14 is formed different in size in the circumferential direction. Specifically, in order that the gaps 28a at opposite two portions in a front-and-rear direction of the vehicle as shown in FIG. 4 are greater than other portions, as shown in FIG. 2, the outer metal member 14 at a second inner peripheral wall 14c is bent outwardly at the opposite two portions and moreover set short, to set the spacing between the second inner peripheral wall 14c and the second member 24 of the inner metal member 12 greater than the other portion. Incidentally, in the opposite two positions, cutout 51 is provided such that a flange 24b of the second member 24 is shorter than other portions.

In this strut mount 50, also as shown in FIG. 2, a cutout 52 is provided in a flange 22b of the first member 22 of the inner metal member 12. Due to this, in the cutout 52 the flange 22b is made shorter than other circumferential portions. This cutout 52 is provided in radially opposite positions with respect to the large gap 28a, i.e., at opposite two positions in a vehicular front-and-rear direction as shown in FIG. 3. Incidentally, in this embodiment, a rubber elastic member 16 is provided to cover the flange 22b of the first member 22 and further extend to an inner surface of a sidewall 22a thereof.

Figure 3:
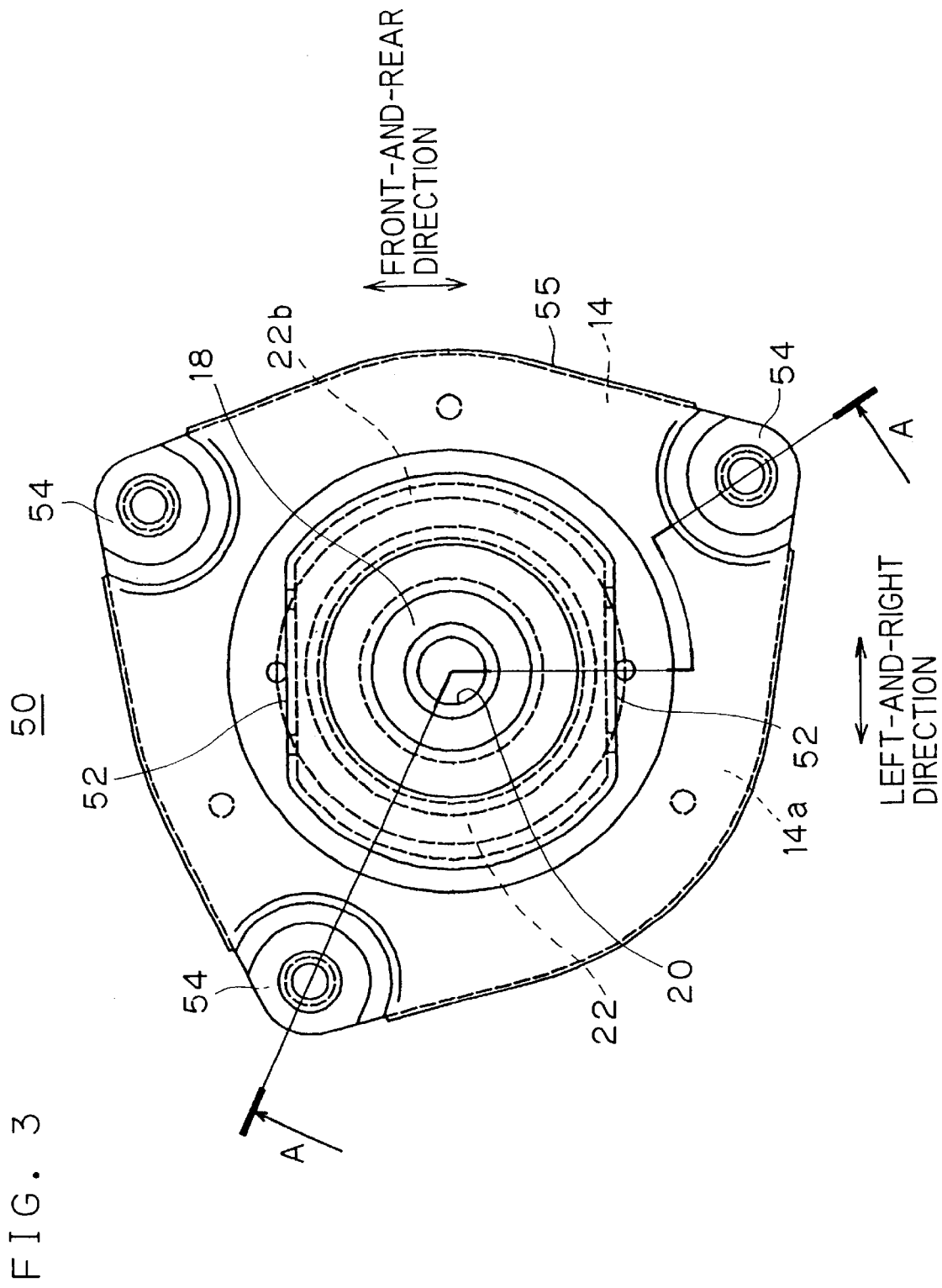
FIG. 3 is a plan view of the same strut mount.
Figure 4:
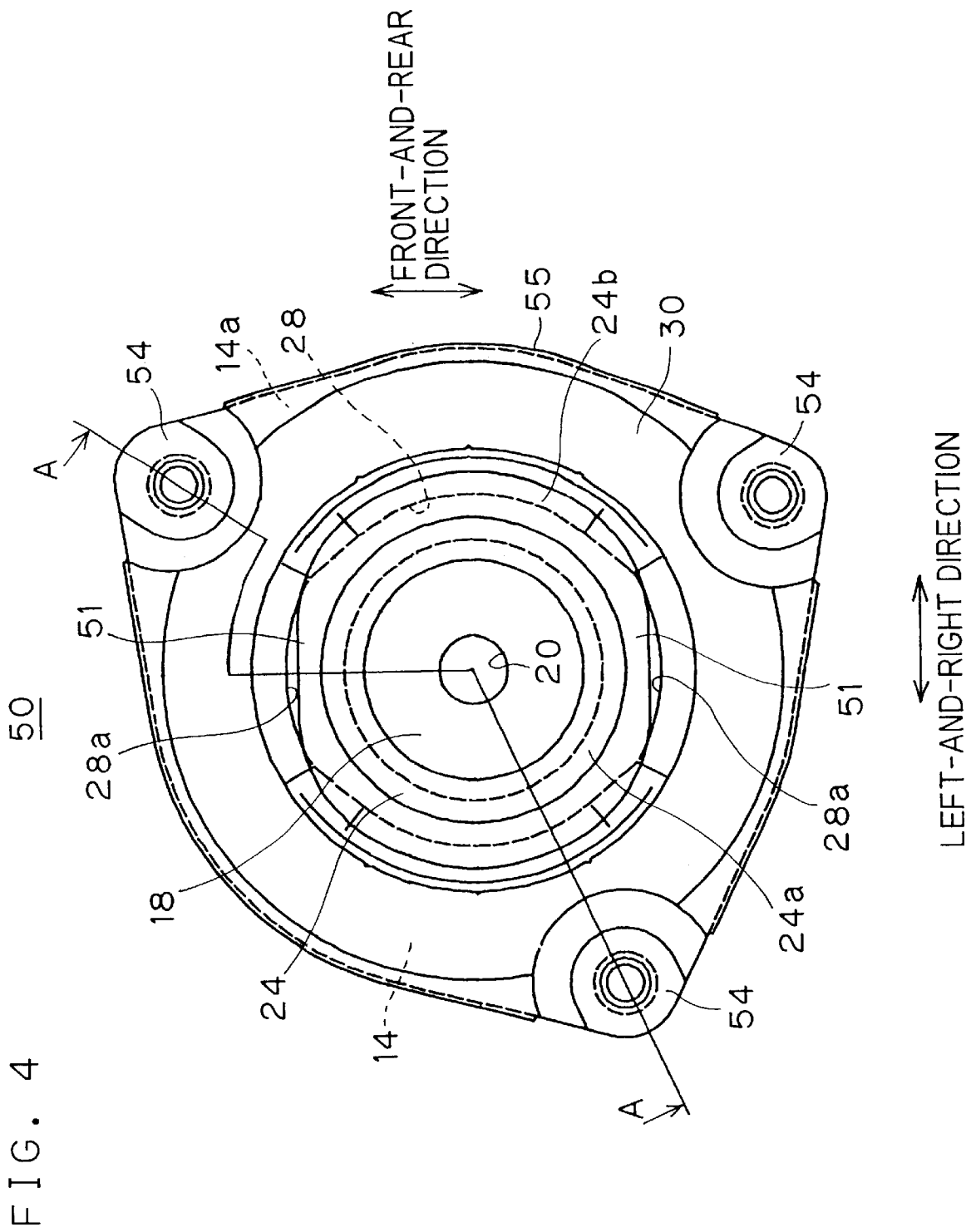
FIG. 4 is a bottom view of the same strut mount.

As shown in FIGS. 3 and 4, attaching portions 54 for fixing the outer metal member 14 to the vehicular body 3 are provided at three circumferential points in the mount surface portion 14a. The mount surface portion 14a is covered in an area except for the attaching portions 54 by a rubber 55 extended from the rubber elastic member 16.

In the strut mount 50 of the second embodiment constructed as above, the gap 28a is made greater on the lower side of the fixing surface portion 18 than the other portion with respect to a front-and-rear direction of the vehicle while the cutout 52 is provided in the flange 22b on the upper side of the fixing surface portion 18, whereby the wrench angle of the rod 5 can be increased in the front-and-rear direction of the vehicle. That is, it is possible to largely set the wrench angle usually less than 5 degrees to nearly 15 degrees. For example, the wrench angle in the front-and-rear direction can be set great at 12 degrees relative to a wrench angle of 5 degrees in the left-and-right direction of the vehicle.

What is claimed is:

1. A strut mount to be interposed between a shock absorber and a vehicular body in a vehicular suspension, comprising:

an inner member having a fixing surface portion vertical to a rod of said shock absorber and an aperture provided in said fixing surface portion to which a tip of said rod is inserted from below;

an outer member surrounding an outer periphery of said inner member and to be mounted to a vehicular body;

an elastic member uniting said inner member and said outer member together on a side above said fixing surface portion fixed with said rod; and a gap being secured circumferentially between said inner member and said outer member on a side below said fixing surface portion, wherein, along a horizontal plane perpendicular to a vertical axis of said rod, said gap varies in size in a circumferential direction.

2. A strut mount according to claim 1, wherein said gap at radially opposite two portions is formed greater than in the other portions.

3. A strut mount according to claim 1, wherein said outer member comprises an inner peripheral wall surrounding the outer periphery of said inner member, and a spacing between the inner peripheral wall of said outer member and said inner member being set different in size in a circumferential direction on a side below said fixing surface portion thereby forming said gap different in size in the circumferential direction.

4. A strut mount to be interposed between a shock absorber and a vehicular body in a vehicular suspension, comprising:

an inner member having a fixing surface portion vertical to a rod of said shock absorber and an aperture provided in said fixing surface portion to which a tip of said rod is inserted from below, said inner member comprising a cup-like member having said fixing surface portion as a bottom and opened to above;

an outer member surrounding an outer periphery of said inner member and to be mounted to a vehicular body, said outer member having an inner peripheral wall surrounding an outer periphery of said cup-like member, said cup-like member at a top-end opening having a flange radially outwardly extending beyond the inner peripheral wall of said outer member, to have a cutout provided at least in a circumferential part of said flange;

an elastic member uniting said inner member and said outer member together on a side above said fixing surface portion fixed with said rod, an outer peripheral surface of a side wall of said cup-like member and the inner peripheral wall of said outer member being united by said elastic member; and a gap being secured circumferentially between said inner member and said outer member on a side below said fixing surface portion.

5. A strut mount according to claim 4, wherein said cutout is provided at radially opposite two portions.

6. A strut mount according to claim 4, wherein said gap in a position radially opposite to said cutout is formed greater than in the other portions.

* * * * *